US008283802B2

(12) United States Patent
Jansma et al.

(10) Patent No.: US 8,283,802 B2
(45) Date of Patent: Oct. 9, 2012

(54) DUAL COLUMN GANG OUTLETS FOR MINIMIZING INSTALLATION SPACE

(75) Inventors: Michael Jansma, Eureka, MO (US); Yuchun Jiang, Saint Peters, MO (US); Jim Phillip Donjon, Maryville, ID (US)

(73) Assignee: American Power Conversion Corporation, West Kingston, RI (US)

( * ) Notice: Subject to any disclaimer, the term of this patent is extended or adjusted under 35 U.S.C. 154(b) by 75 days.

(21) Appl. No.: 12/569,254

(22) Filed: Sep. 29, 2009

(65) Prior Publication Data

US 2010/0314943 A1 Dec. 16, 2010

Related U.S. Application Data

(60) Provisional application No. 61/186,241, filed on Jun. 11, 2009.

(51) Int. Cl.
*H02J 1/10* (2006.01)
*H02J 3/38* (2006.01)
*H02J 9/00* (2006.01)

(52) U.S. Cl. .... 307/23; 439/654; D13/139.6; D13/139.8

(58) Field of Classification Search .............. D13/139.6, D13/139.8
See application file for complete search history.

(56) References Cited

U.S. PATENT DOCUMENTS

| | | | | |
|---|---|---|---|---|
| 3,170,744 | A | 2/1965 | Farnsworth | |
| 3,171,113 | A | 2/1965 | McNamara | |
| 3,257,497 | A * | 6/1966 | Chase | 174/66 |
| 3,500,284 | A | 3/1970 | Liberman | |
| 3,676,571 | A * | 7/1972 | Rubinstein | 174/663 |
| 4,154,499 | A | 5/1979 | Weber | |
| 4,477,131 | A | 10/1984 | Joly | |
| 4,613,728 | A * | 9/1986 | Lathrop | 174/53 |
| 5,190,481 | A * | 3/1993 | Ju | 439/654 |
| D354,731 | S | 1/1995 | Lee | |
| 5,429,518 | A | 7/1995 | Chen | |

(Continued)

FOREIGN PATENT DOCUMENTS

EP 0579568 A1 1/1994

OTHER PUBLICATIONS

WO 2007/133165 to Xia et al., Nov. 22, 2007.*

(Continued)

*Primary Examiner* — Rexford Barnie
*Assistant Examiner* — Justen Fauth
(74) *Attorney, Agent, or Firm* — Lando & Anastasi, LLP

(57) ABSTRACT

A power distribution unit disclosed herein includes a plurality of power outlets arranged in adjacent columns, the first and the second terminals of the power outlets in a first column formed along a first line, the first and the second terminals of the power outlets in a second column formed along a second line, ground terminals of the power outlets in the first column formed along a third line, and ground terminals of the power outlets of the second column formed along a fourth line, wherein the first line, the second line, the third line, and the fourth line are arranged in parallel, and wherein the plurality of power outlets are arranged in one of an arrangement in which the third and fourth lines are positioned between the first and second lines, and an arrangement in which the first and second lines are positioned between the third and fourth lines.

20 Claims, 14 Drawing Sheets

U.S. PATENT DOCUMENTS

| | | | | |
|---|---|---|---|---|
| D368,893 | S | 4/1996 | Harwood et al. | |
| D371,341 | S * | 7/1996 | Hung et al. | D13/137.2 |
| 5,582,520 | A | 12/1996 | Doudon | |
| D381,317 | S | 7/1997 | Yu | |
| 5,647,043 | A * | 7/1997 | Anderson et al. | 385/78 |
| 5,651,693 | A * | 7/1997 | Fukuda et al. | 439/489 |
| D409,978 | S | 5/1999 | Stekelenburg | |
| 6,015,307 | A | 1/2000 | Chiu | |
| 6,072,705 | A | 6/2000 | Hsu | |
| 6,095,846 | A * | 8/2000 | Becerra | 439/371 |
| D435,516 | S | 12/2000 | Stekelenburg | |
| D436,922 | S | 1/2001 | Stekelenburg | |
| 6,179,665 | B1 * | 1/2001 | Rossman et al. | 439/654 |
| 6,220,880 | B1 | 4/2001 | Lee | |
| 6,315,593 | B1 | 11/2001 | Bentley et al. | |
| 6,371,796 | B2 * | 4/2002 | Fukuda | 439/489 |
| 6,443,746 | B1 | 9/2002 | Yu | |
| 6,443,762 | B1 * | 9/2002 | Lessig, III | 439/528 |
| 6,486,407 | B1 | 11/2002 | Hawker et al. | |
| 6,491,539 | B1 * | 12/2002 | Johnston | 439/373 |
| 6,514,093 | B1 | 2/2003 | Yu | |
| 6,638,074 | B1 | 10/2003 | Fisher | |
| 6,699,060 | B1 * | 3/2004 | Scott | 439/373 |
| D489,685 | S | 5/2004 | Yu | |
| D490,777 | S | 6/2004 | Yu | |
| 6,750,410 | B2 | 6/2004 | Lee | |
| 6,756,543 | B1 * | 6/2004 | Kaloustian | 174/67 |
| 6,935,880 | B1 * | 8/2005 | Su | 439/218 |
| 6,939,180 | B1 | 9/2005 | Wu | |
| 6,940,015 | B2 | 9/2005 | Fang | |
| 6,966,792 | B1 * | 11/2005 | Willers et al. | 439/373 |
| 7,052,313 | B2 | 5/2006 | Gorman | |
| 7,148,419 | B1 | 12/2006 | Harrigan | |
| 7,192,289 | B2 | 3/2007 | Kowalski | |
| 7,195,500 | B2 | 3/2007 | Huang et al. | |
| 7,268,998 | B2 | 9/2007 | Ewing et al. | |
| 7,400,239 | B2 | 7/2008 | Kiko et al. | |
| 7,438,589 | B1 | 10/2008 | Fleury et al. | |
| 7,455,546 | B1 * | 11/2008 | Yoon et al. | 439/373 |
| 7,479,031 | B2 | 1/2009 | Tiberio et al. | |
| 7,488,204 | B2 | 2/2009 | Hsu | |
| 7,500,854 | B2 | 3/2009 | Gottstein | |
| 7,513,791 | B1 * | 4/2009 | Gary | 439/373 |
| 7,554,033 | B1 | 6/2009 | Bhosale et al. | |
| 7,581,977 | B1 | 9/2009 | Wu | |
| 7,675,739 | B2 | 3/2010 | Ewing et al. | |
| 7,679,007 | B1 | 3/2010 | Walker et al. | |
| 7,749,019 | B2 | 7/2010 | Valentin et al. | |
| 7,753,699 | B2 | 7/2010 | Wu | |
| 2002/0189848 | A1 | 12/2002 | Hawker | |
| 2003/0092297 | A1 | 5/2003 | Reindle et al. | |
| 2005/0142923 | A1 * | 6/2005 | Horiuchi | 439/352 |
| 2005/0221629 | A1 * | 10/2005 | Woellner et al. | 439/10 |
| 2006/0046557 | A1 * | 3/2006 | Pulizzi et al. | 439/371 |
| 2006/0057873 | A1 | 3/2006 | Ortega | |
| 2006/0092600 | A1 | 5/2006 | Ewing et al. | |
| 2006/0110948 | A1 * | 5/2006 | Gerard | 439/21 |
| 2006/0199438 | A1 | 9/2006 | Cleveland | |
| 2006/0264087 | A1 * | 11/2006 | Woellner et al. | 439/371 |
| 2006/0270266 | A1 * | 11/2006 | Sinner et al. | 439/373 |
| 2007/0077825 | A1 * | 4/2007 | Kuo | 439/686 |
| 2008/0116748 | A1 | 5/2008 | Yeh | |
| 2009/0137142 | A1 * | 5/2009 | Xia et al. | 439/350 |
| 2011/0070756 | A1 * | 3/2011 | Peckham | 439/133 |

OTHER PUBLICATIONS

Invitation to Pay Additional Fees in corresponding International Application No. PCT/US2010/037962 dated, Sep. 1, 2010.

International Search Report and Written Opinion in corresponding International Application No. PCT/US2010/037962 dated, Oct. 15, 2010.

* cited by examiner

DUAL COLUMN GANG OUTLETS FOR MINIMIZING INSTALLATION SPACE

RELATED APPLICATIONS

This application claims priority under 35 U.S.C. §119(e) to U.S. Provisional Application Ser. No. 61/186,241, entitled "DUAL ROW IEC C13 AND/OR C19 GANG OUTLETS FOR MINIMIZING INSTALLATION SPACE," filed on Jun. 11, 2009, which is herein incorporated by reference in its entirety.

BACKGROUND OF INVENTION

1. Field of Invention

The present disclosure is directed to locking electrical outlet units, and more specifically, to power distribution unit (PDU) products which include locking electrical outlets, for example, electrical outlets conforming to the International Electrotechnical Commission (IEC) IEC 60320 standard, including IEC-C13 or IEC-C19 compliant electrical outlets.

2. Discussion of Related Art

The arrangement of outlets in many conventional locking outlet technologies includes a gap between individual (non-ganged) outlets to accommodate the locking feature. This gap between outlets limits the number of outlets that can be included within a given area and precludes the use of industry standard ganged receptacles if the locking feature is desired.

SUMMARY OF INVENTION

Embodiments and aspects of the present disclosure relate to power outlets units including ganged electrical outlets for use in equipment such as power distribution units or uninterruptible power supplies. The power outlet units disclosed herein provide for the inclusion of a locking feature in the outlets which facilitates securing power cords to the electrical outlets to help prevent accidental decoupling of the power cords from the power outlets. The power outlet units include ganged power outlets arranged in a configuration that facilitates the inclusion of a high number of power outlets within a given area.

In accordance with one embodiment, there is provided a power distribution unit. The power distribution unit comprises an input configured to receive input power and a housing. The housing includes a first outer edge, a second outer edge, and a top surface contained between the first outer edge and the second outer edge and having a plurality of power outlets, each of the plurality of power outlets having three output terminals, including a ground terminal, a first terminal, and a second terminal. The plurality of power outlets are arranged in two adjacent columns, including a first column and a second column with at least two power outlets in each of the first column and the second column wherein the plurality of power outlets are arranged such that the first terminals and the second terminals of the power outlets in the first column are formed along a first line, the first terminals and the second terminals of the power outlets in the second column are formed along a second line, the ground terminals of the power outlets in the first column are formed along a third line, and the ground terminals of the power outlets of the second column are formed along a fourth line. The first line, the second line, the third line, and the fourth line are arranged in parallel. The plurality of power outlets are arranged in one of an arrangement in which the third and fourth lines are positioned between the first and second lines, and an arrangement in which the first and second lines are positioned between the third and fourth lines.

In accordance with one aspect of the power distribution unit, the input includes a power cord having a ground conductor coupled to the ground terminals of each of the plurality of power outlets, a first conductor coupled to each of the first terminals of the plurality of power outlets, and a second conductor coupled to each of the second terminals of the plurality of power outlets.

In accordance with another aspect, the power distribution unit further comprises a battery contained within the housing, and wherein the power distribution unit is configured as an uninterruptible power supply configured to provide power to the first terminals and the second terminals of the power outlets from the battery upon loss of power at the input.

In accordance with another aspect, the housing has a width and a length, with the length being greater than the width, and wherein the length of the housing extends in a direction parallel to the first line.

In accordance with another aspect, the power distribution unit further comprises at least one slot formed in the housing and wherein at least one of the plurality of power outlets is associated with the at least one slot, and wherein the at least one slot is configured to mechanically retain a locking tab of a locking power cord.

In accordance with another aspect, each of the plurality of power outlets is electrically connected to a ground conductor, a first conductor and a second conductor and wherein at least one of the ground conductor, the first conductor and the second conductor of at least one of the plurality of power outlets is electrically isolated from each of the ground conductor, the first conductor, and the second conductor of all other of the plurality of power outlets in the power outlet unit.

In accordance with another aspect, the power outlets conform to the International Electrotechnical Commission IEC 60320 standard.

In accordance with another aspect, a spacing between adjacent power outlets is less than a spacing between the third and the fourth lines.

In accordance with another aspect, the power distribution unit further comprises power input terminals asymmetrically arranged about a center axis of the power outlet unit.

In accordance with another aspect, the power distribution unit further comprises an asymmetrically configured housing.

In accordance with another embodiment, there is provided a power outlet unit. The power distribution unit comprises a housing, a plurality of electrical outlets, and at least one of a slot or a recess formed in the housing, at least one of the at least one of the slot or recess associated with each of the plurality of electrical outlets, each of the at least one of the slot or recess configured to retain a locking tab of a locking power cord, wherein the housing includes four walls and two of the four walls include at least one of the at least one of the slot or recess formed therein.

In accordance with an aspect of the power outlet unit, the plurality of electrical outlets includes at least one group of four electrical outlets arranged in a 2×2 grid arrangement.

In accordance with another aspect, the plurality of electrical outlets includes at least one group of six electrical outlets arranged in a 2×3 grid arrangement. The at least one group of six electrical outlets may be arranged within a surface having a surface area of less than 60 square centimeters.

In accordance with another embodiment, there is provided a method of distributing power. The method of distributing power comprises mounting a power distribution unit in an electrical equipment rack containing electrical equipment, the power distribution unit including a plurality of power outlets each having an opening to receive a locking tab of a locking power cord, providing a plurality of locking power cords each having a first end and a second end, the second end having a locking tab, and the second end having a first terminal, a second terminal, and a ground terminal, coupling the first end of a first locking power cord to a first electrical equipment unit mounted in the electrical equipment rack, coupling the second end of the first locking power cord into a first one of the plurality of power outlets such that the locking tab of the first locking power cord mates with the opening of the first one of the plurality of power outlets, and such that the first terminal, the second terminal and the ground terminal of the first one of the plurality of power outlets are in a first rotational position, and coupling the first end of a second locking power cord of the plurality of locking power cords to a second electrical equipment unit mounted in the electrical equipment rack, coupling the second end of the second locking power cord into a second one of the plurality of power outlets such that the locking tab of the second locking power cord mates with the opening of the second one of the plurality of power outlets, and such that the first terminal, the second terminal and the ground terminal of the second one of the plurality of power outlets are in a second rotational position offset from the first rotational position by 180 degrees.

In accordance with an aspect of the a method of distributing power, the plurality of power outlets includes at least one group of four power outlets arranged in a 2×2 grid arrangement.

In accordance with another aspect, the a method of distributing power further comprises coupling the second end of a third locking power cord into a third one of the plurality of power outlets such that the locking tab of the third locking power cord mates with the opening of the third one of the plurality of power outlets, and such that the first terminal, the second terminal and the ground terminal of the third one of the plurality of power outlets are in the first rotational position. The method may further comprising coupling the second end of a fourth locking power cord into a fourth one of the plurality of power outlets such that the locking tab of the fourth locking power cord mates with the opening of the fourth one of the plurality of power outlets, and such that the first terminal, the second terminal and the ground terminal of the fourth one of the plurality of power outlets are in the second rotational position.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
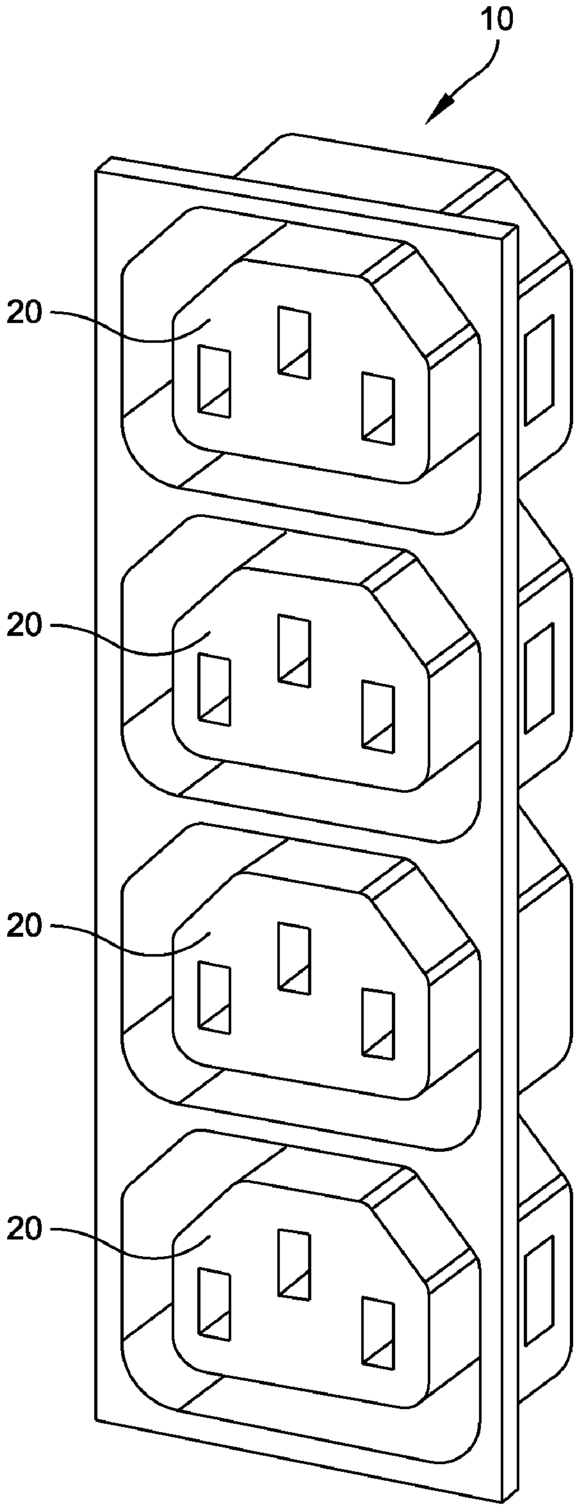
FIG. 1A is a isometric view of a conventional ganged outlet unit from the front side.
Figure 1B:
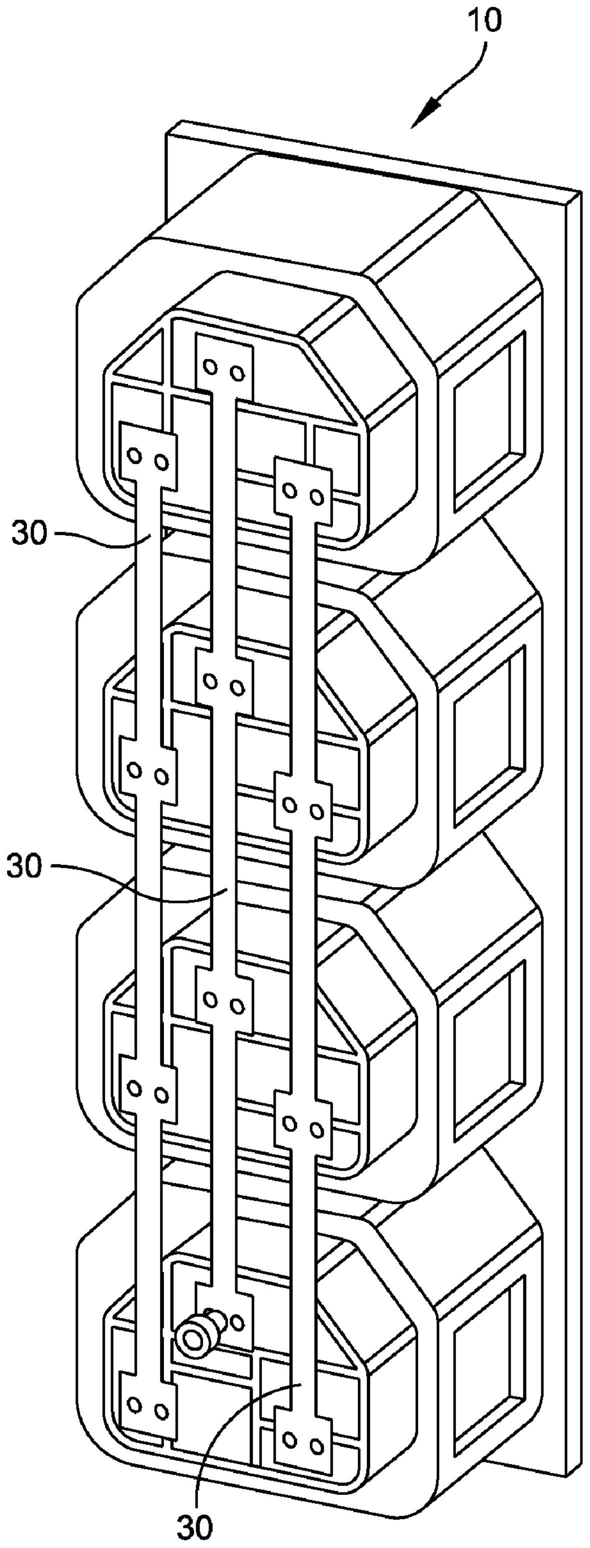
FIG. 1B is a isometric view of a conventional ganged outlet unit from the rear side.
Figure 2A:
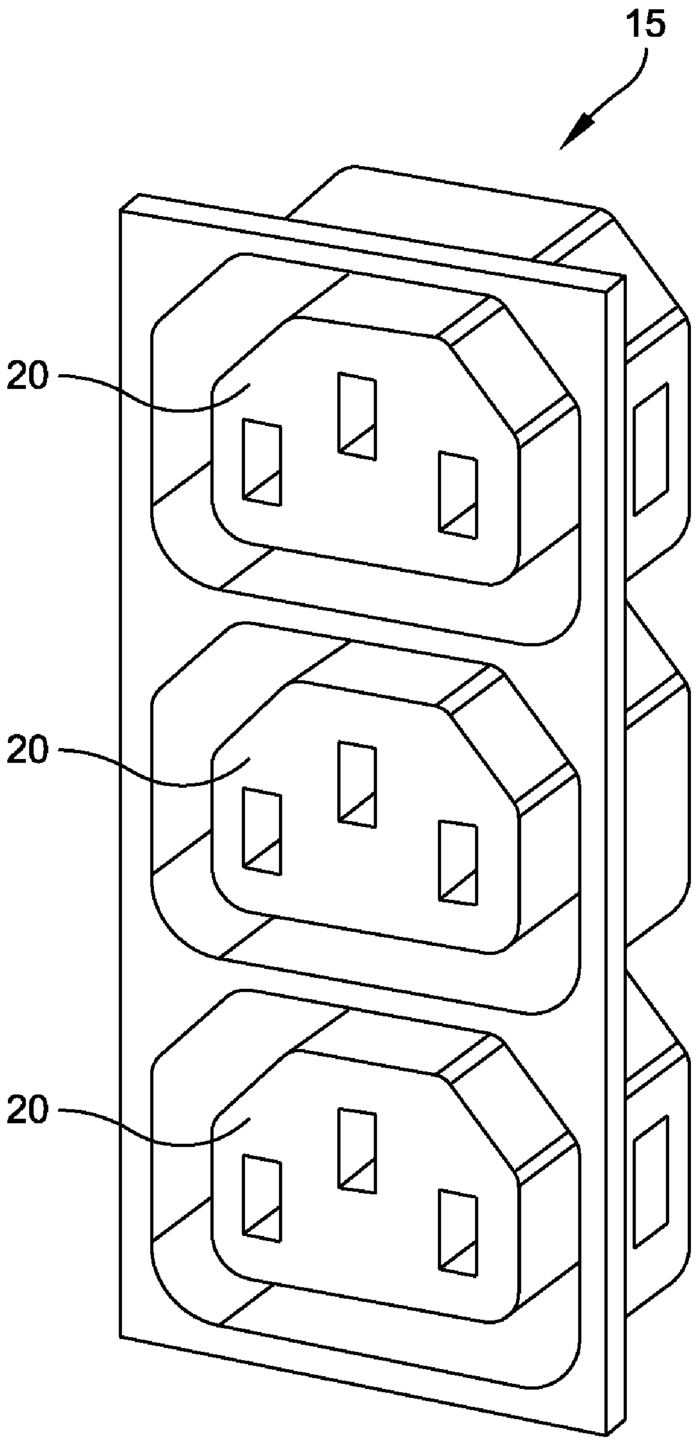
FIG. 2A is a isometric view of a second type of conventional ganged outlet unit from the front side.
Figure 2B:
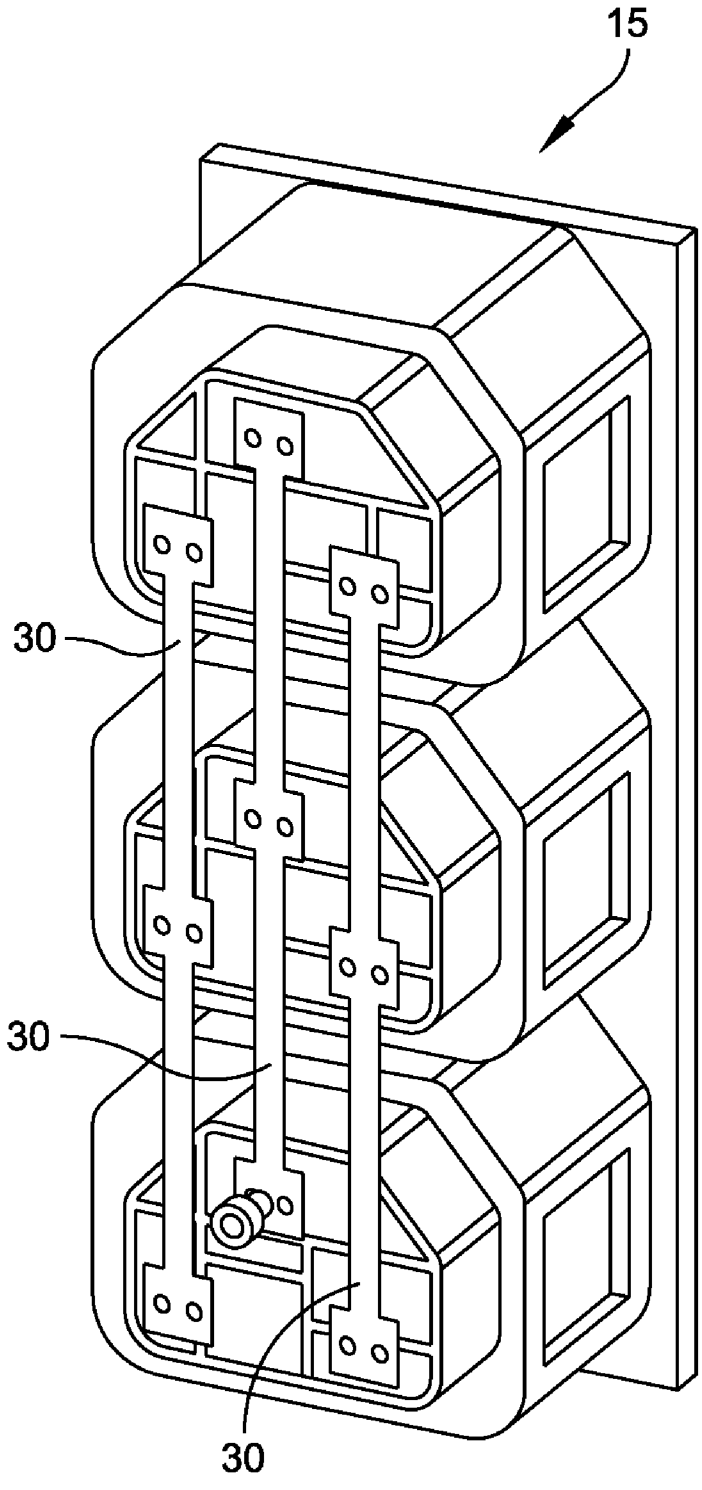
FIG. 2B is a isometric view of a second type of conventional ganged outlet unit from the rear side.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present disclosure is directed toward locking electrical outlet units and to power distribution unit (PDU) or uninterruptible power supply (UPS) products which include locking electrical outlets, for example, electrical outlets conforming to the International Electrotechnical Commission (IEC) IEC-C13 or IEC-C19 standards. These outlets may be used in conjunction with locking electrical cords such as those developed by Volex Group plc of Birchwood Science Park, Warrington, WA3 7JX, England, for example, those described in U.S. Patent Application Publication No. 2009/0137142 A1, entitled "POSITIVE LOCK CONNECTOR." Locking outlets and locking power cords provide a method of securing power cords without the use of bulky brackets or alternative methods of securing power cords to, for example, an electrical equipment rack power distribution source. Some locking outlets are designed to be used with power cords including a locking tab, such as power cord 50, illustrated in FIGS. 3, 9, and 10. When inserted into an outlet, a locking tab 60 on the power cord 50 secures the power cord 50 to the outlet. The locking tab 60 may engage a slot or recess 70 in an outlet into which the power cord 50 is inserted to lock the power cord 50 in place in the outlet. To remove the power cord 50, the locking tab 60 may be manually depressed. Although Volex locking power cords and outlets are described herein, this disclosure is not limited to Volex-type power cords and outlets. Other locking outlet technologies may also be utilized in conjunction with embodiments of the present disclosure.

Figure 3:
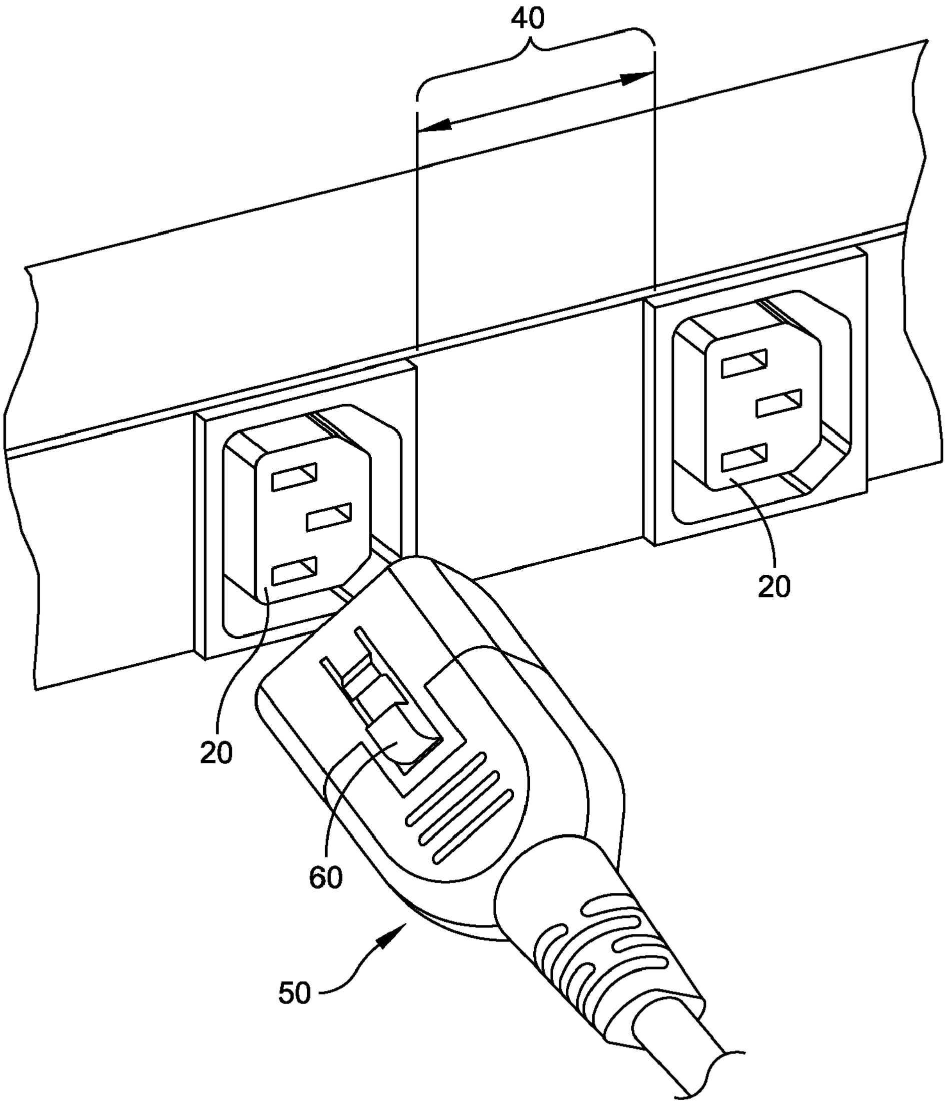
FIG. 3 illustrates a portion of a conventional unit showing the spacing between individual (non-ganged) outlets required if the outlet unit is to be used in conjunction with a lock-in-place electrical cord.
Figure 4:
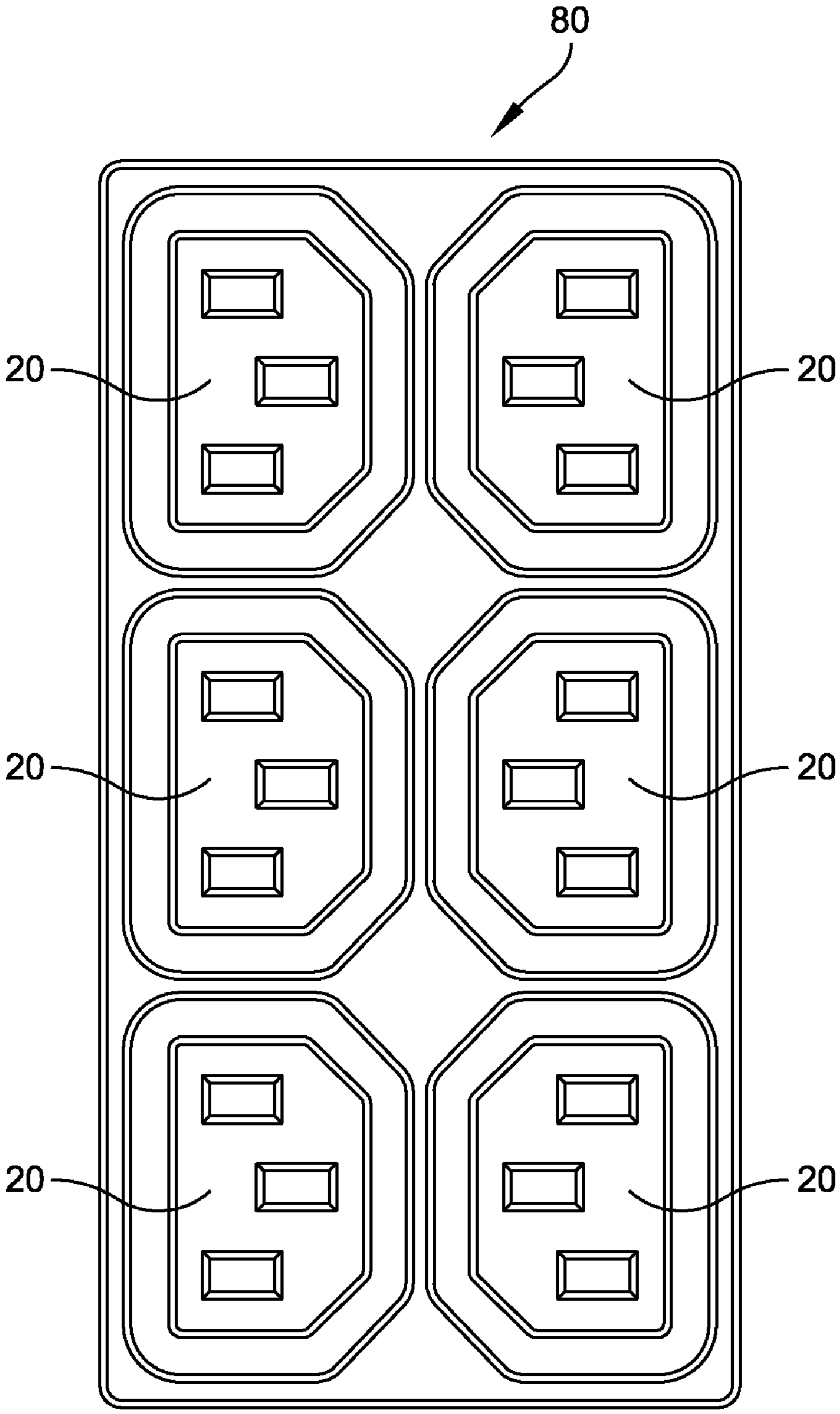
FIG. 4 is a plan view of a ganged outlet unit according to an embodiment of the present disclosure.
Figure 5:
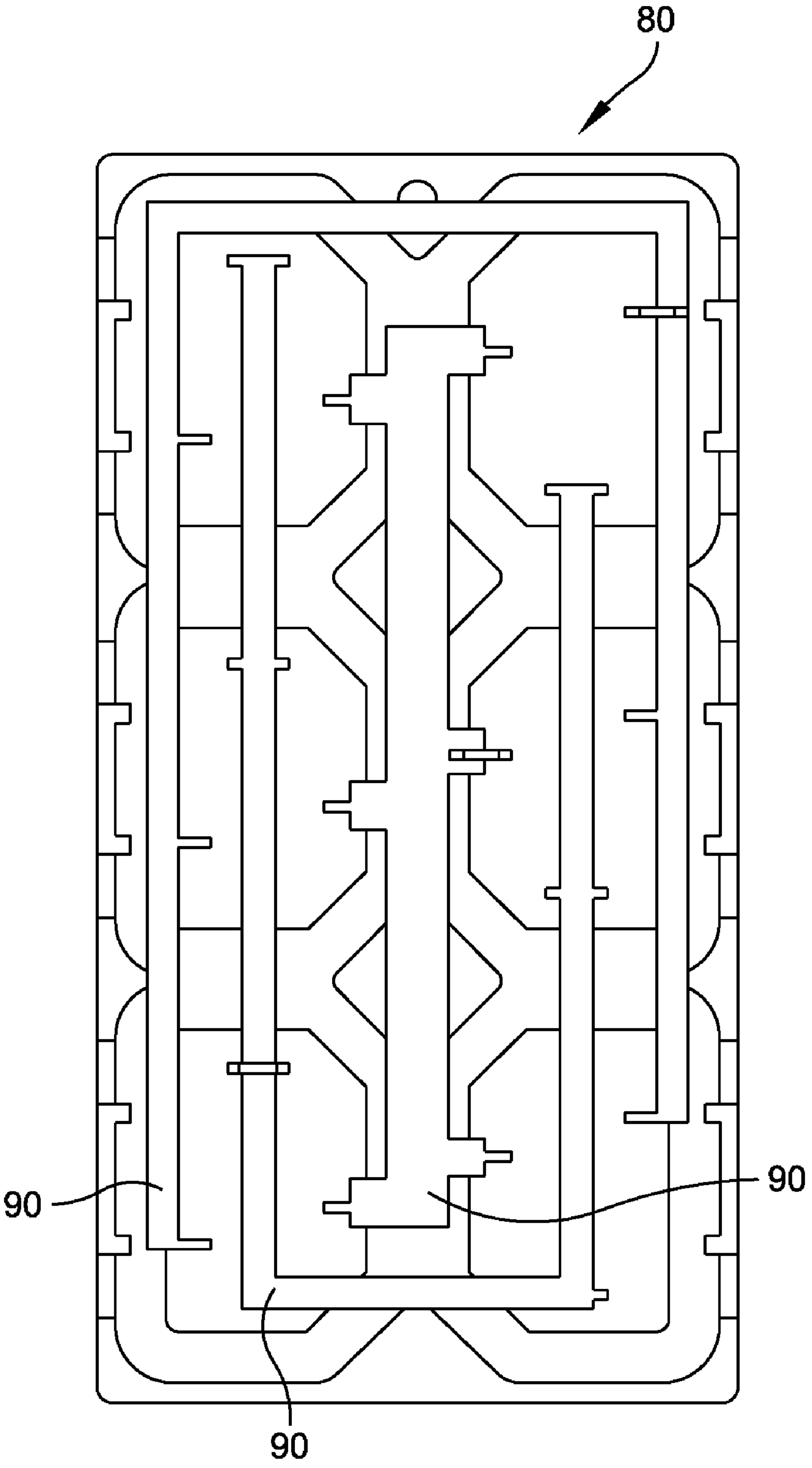
FIG. 5 is a plan view of the rear side of the ganged outlet unit of FIG. 4.
Figure 6:
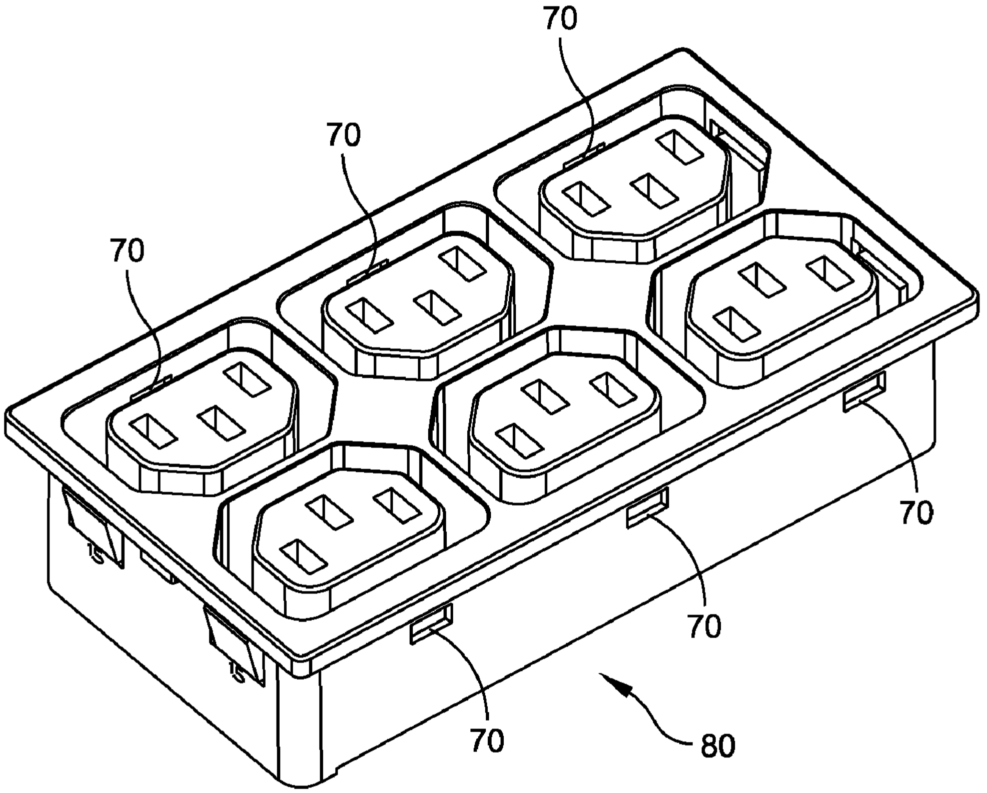
FIG. 6 is an isometric view of the front side of the ganged outlet unit of FIG. 4.

Conventional locking outlet technologies often require the inclusion of a gap 40 between outlets 20 to accommodate the locking feature. This gap 40 between representative conventional locking outlets 20 is shown in FIG. 3. This arrangement of outlets is contrasted with conventional individual (non-ganged) outlet units for use with non-locking power cords which may include IEC outlets arranged in a linear pattern. Examples of such conventional ganged IEC outlet units 10, 15 are illustrated in FIGS. 1A, 1B, 2A, and 2B. These conventional outlet units 10, 15 can have outlets 20 closely spaced, as they need not accommodate a locking feature on a power cord. These conventional outlet units 10, 15 may include electrical conductors 30 to deliver power to the individual outlets 20 and/or to provide a connection to ground.

Many rack mountable PDUs 110 are designed to fit within industry standard enclosures, such as a 42U enclosure, which limits the total length of vertical mount rack PDUs 110 which may be used. Due to the spacing gap required between outlets 20 to accommodate the Volex locking feature, the total number of outlets 20 which can be placed on a standard electrical equipment rack PDU 110 is limited to a number smaller than consumers may desire. Embodiments of the present disclosure facilitate the provision of an increased number of locking electrical outlets 20 that can fit in a limited amount of space. Embodiments of the present disclosure are applicable to, for example, electrical equipment rack power distribution units 110 and uninterruptible power source (UPS) devices as well as other power distribution devices.

At least some embodiments of PDUs 110 described in this disclosure include novel electrical outlet orientations and layouts which allow a greater number of locking electrical outlets 20 to be provided within a given space.

Illustrated in FIGS. 4-8 is an example of an electrical outlet configuration that may be utilized in some embodiments of ganged outlet units 80 in accordance with the present disclosure. The outlet configuration illustrated in FIGS. 4-8 includes two adjacent columns of electrical outlets 20 facing opposite of one another. In one column of electrical outlets 20, the electrical outlets 20 are rotated 180 degrees from the electrical outlets 20 in the other column. The outlets 20 illustrated in FIGS. 4-8 are arranged in a 2×3 grid arrangement. In alternate embodiments, greater or fewer than six outlets 20 may be present. For example, a ganged outlet unit 80 could include four outlets, such as the four outlets in the top two rows illustrated in FIG. 4, which are arranged in a 2×2 grid arrangement. Each outlet 20 includes two power terminals and one ground terminal. The present disclosure is not limited to the type of outlets illustrated. Different outlets, such as those configured for use with, for example, European or Chinese style plugs may also be utilized in different embodiments of the present disclosure. FIGS. 4-8 illustrate a ganged outlet unit 80 with six outlets, however, different embodiments may have different numbers of outlets 20 (e.g. 2 columns of 3 outlets as shown or 2 columns of X outlets, with X being equal to 1, 2, 3, 4, etc.). Further, different embodiments of ganged outlet units 80 may have outlets 20 configured differently than illustrated. For example, in some embodiments of a ganged outlet unit 80, one or more outlets 20 may be rotated 180 degrees from what is illustrated in FIGS. 4-8.

In some embodiments of a ganged outlet unit 80, one or more additional locking outlets 20 may be included with a space between the outlets 20 arranged in the adjacent columns and the additional outlets 20, such as the space 40 illustrated in FIG. 3. In some embodiments of a ganged outlet unit 80, one or more additional locking outlets 20 may be included rotated 90 degrees from the other outlets 20 and located adjacent to the other locking outlets 20, but with an open space on the side of the additional outlets not adjacent the other outlets 20. In other embodiments of a ganged outlet unit 80, non-locking outlets may be included along with locking outlets 20. In some embodiments, the columns of outlets 20 may be offset from one another such that outlets 20 in one column are not aligned with outlets 20 in another column Some embodiments of a ganged outlet unit 80 may include more than two columns of outlets. In the example ganged outlet unit 80 of FIGS. 4-8, the outlets 20 are in dual column arrangement with the ground terminals facing each other. In other embodiments, the outlets 20 could be arranged such that the ground terminals face away from each other.

In at least one embodiment, all the line, neutral and ground terminals are connected by three separate metal conductors 90. These connectors may be seen in the rear views of the ganged outlet unit 80 illustrated in FIGS. 5, 7, and 8. In some embodiments, there are only three quick connect terminals 100 for the entire ganged outlet unit 80, that is, one line, one neutral, and one ground. Other embodiments may have a greater number of terminals 100. Optionally, the unit 80 could also be configured by using quick connect or solder terminals connected to a secondary PCB board for ganging (bussing) the line, neutral, or ground features. Also optionally, line and/or neutral terminals on different outlets 20 can remain unganged to allow connection to individual or different power sources.

The configuration of outlets 20 illustrated in FIGS. 4-8 provides advantages over electrical outlet configurations such as those illustrated in FIGS. 1A-3. This is because ganged outlets 20 in a single column or row arrangement, such as those illustrated in FIGS. 1A-3 cannot accommodate the self-locking feature of self-locking power cords 50, such as those provided by Volex Group plc. Single column or row gang outlets require more chassis length for the same number of outlets 20 as ganged outlet units 80 according to the present disclosure. As such, at least some embodiments of the present disclosure facilitate fitting more locking outlets 20 in a small compact space than was previously achievable.

In the configuration of outlets 20 illustrated in FIGS. 4-8, adjacent outlets may be abutted against each other so that there is little or no spacing between outlets. In one embodiment, a spacing between adjacent outlets, e.g. a spacing between outlets in a vertical direction in FIG. 4, may be about 2.2 mm, and a spacing between opposite outlets, e.g. a spacing between outlets in a horizontal direction in FIG. 4, may be about 1.1 mm. This spacing may facilitate easier insertion or removal of power cords from the ganged outlet than would be possible if the outlets were more closely spaced. In at least one embodiment, the spacing and arrangement of outlets may result in a ganged outlet configuration with six outlets included in an outlet unit with a length of about 10.1 cm, a width of about 5.5 cm, and a surface area of about 55.5 square centimeters. Greater spacing between outlets may be provided in some embodiments, which would result in a lower density of power outlets in the ganged outlet unit.

Figure 7:
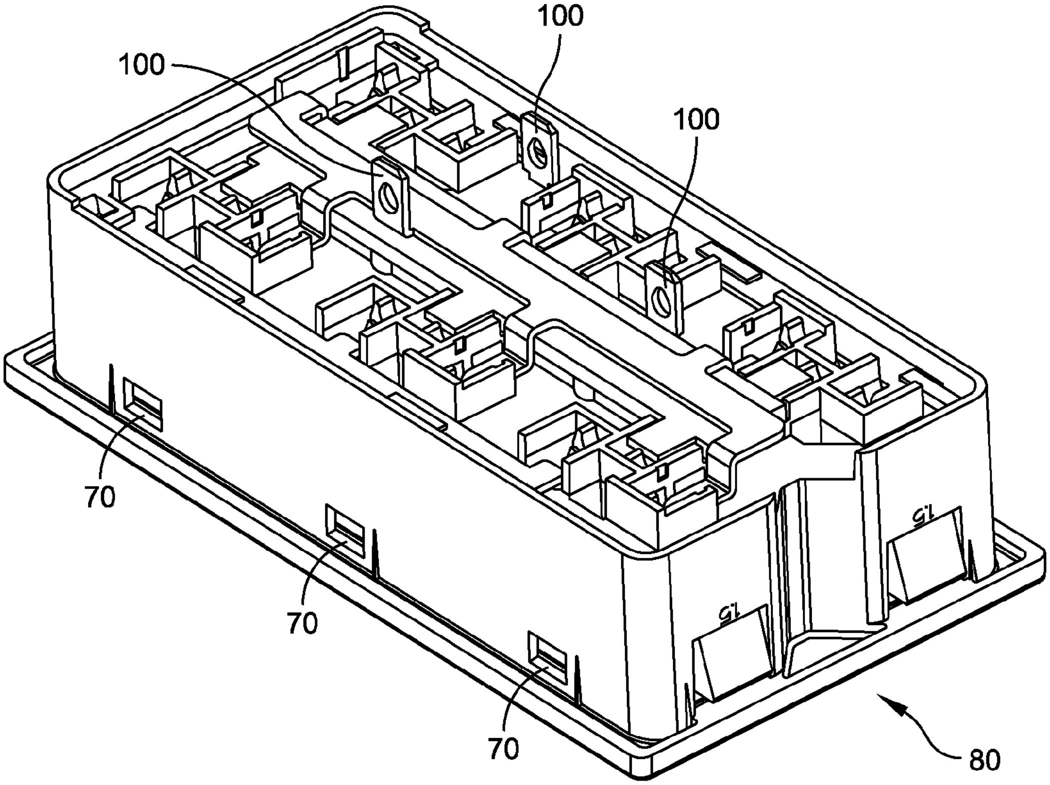
FIG. 7 is an isometric view of the rear side of the ganged outlet unit of FIG. 4.
Figure 8:
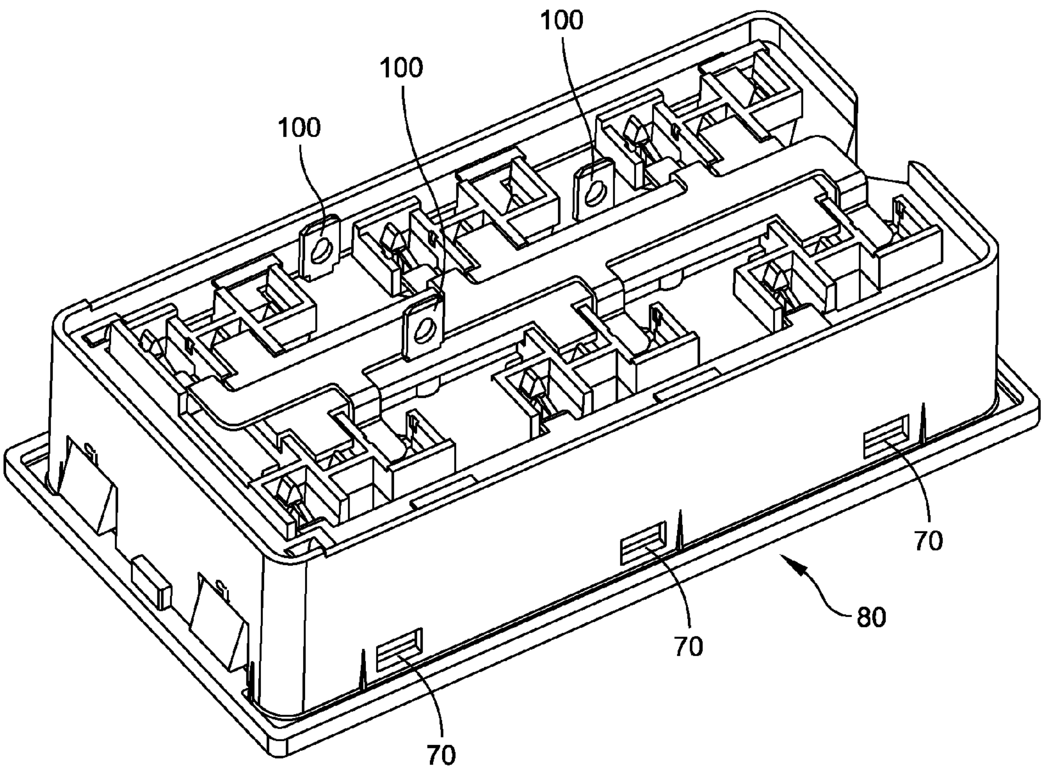
FIG. 8 is an alternate isometric view of the rear side of the ganged outlet unit of FIG. 4.

In some embodiments, a ganged outlet unit 80 in accordance with the present disclosure may include one or more features that permit installation of the gang outlet 80 in a single direction only. To this end, the ganged outlet unit 80 may include an asymmetric electrical connector configuration, as is illustrated in FIGS. 7 and 8. Alternatively or additionally, opposite ends of the ganged outlet unit 80 may have different features which allow for the ganged outlet unit 80 to be installed in an outlet mount and/or PDU 110 in only a single direction. Features according to the present disclosure which permit installation of gang outlets 80 in a single direction only may facilitate maintaining line and neutral terminals being in the same position in corresponding electrical outlets in each gang outlet 80 installed in a PDU.

Figure 9:
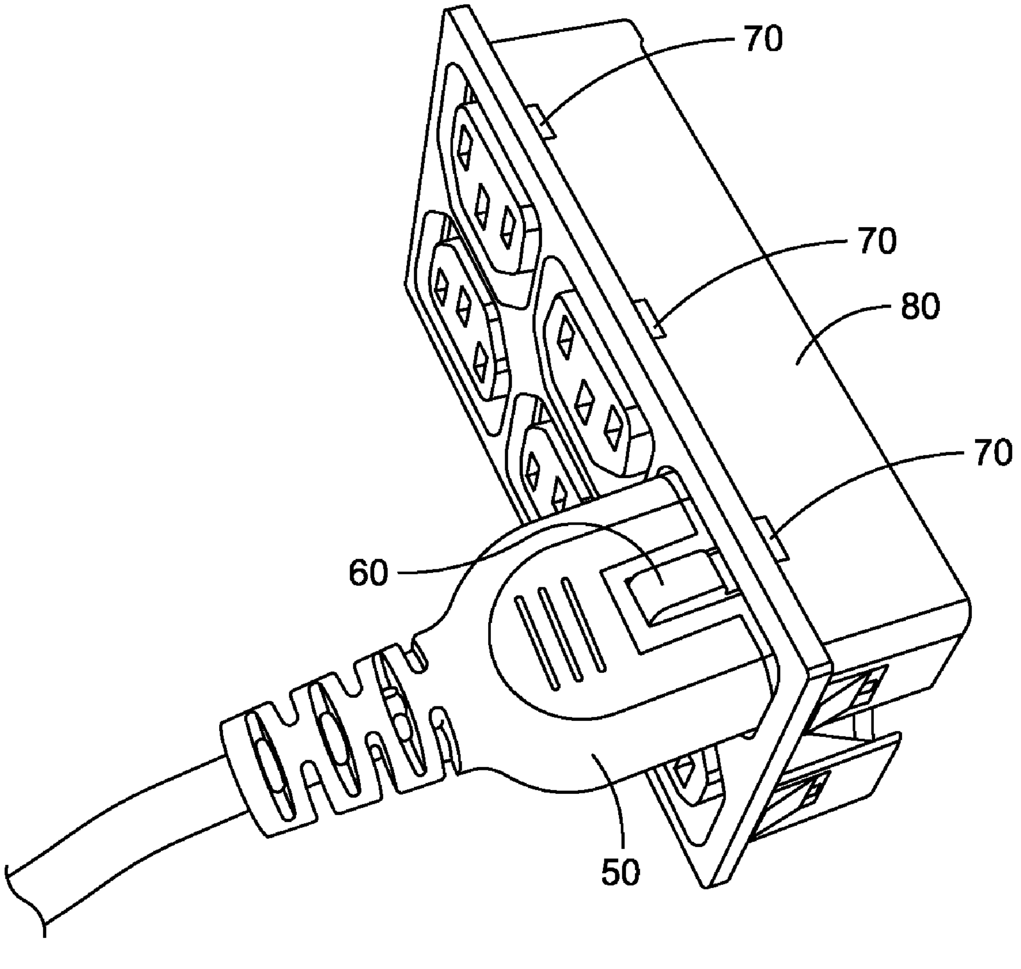
FIG. 9 illustrates a locking power cord and outlet in accordance with an embodiment of the present disclosure in a connected, locked configuration.
Figure 10:
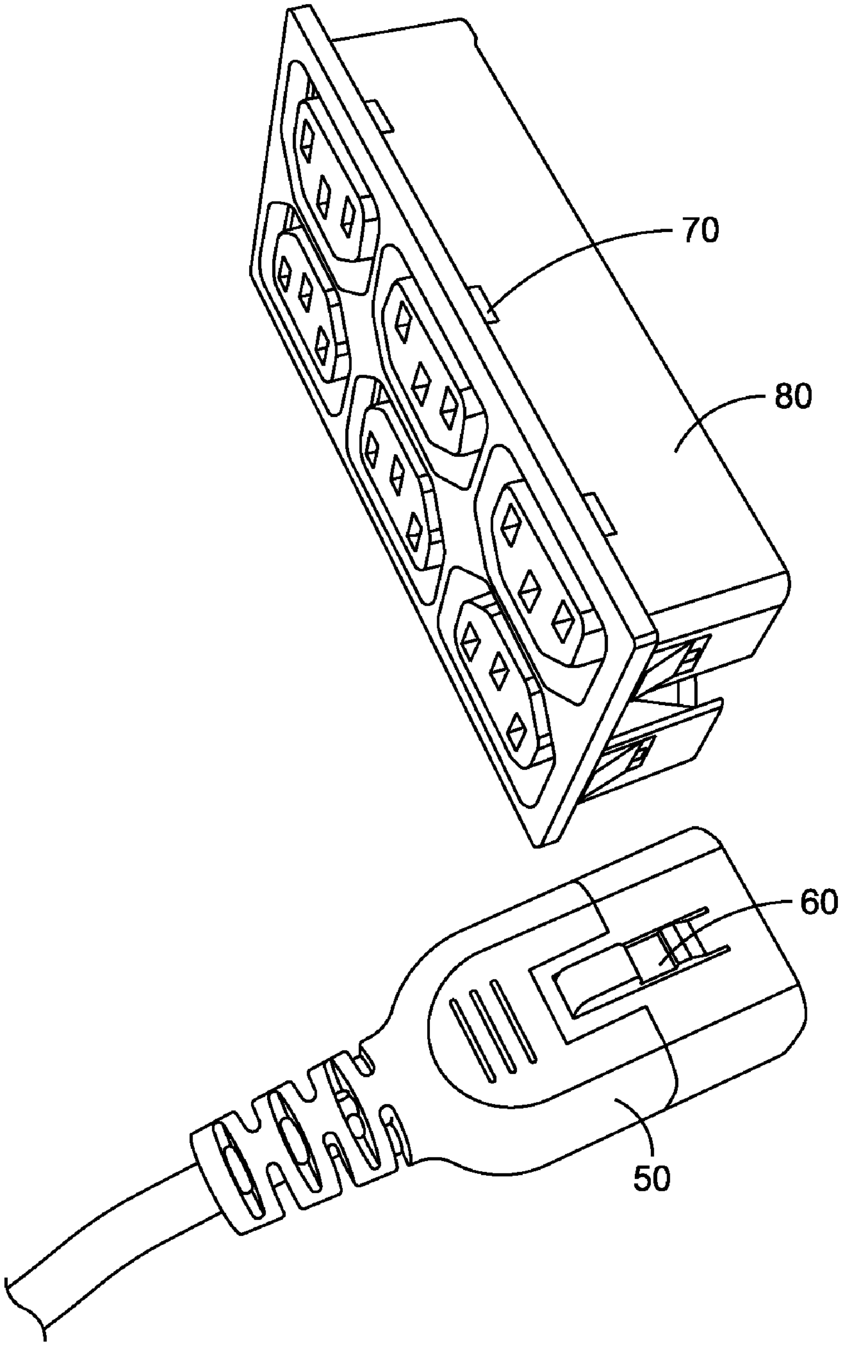
FIG. 10 illustrates the locking power cord and outlet of FIG. 9 in a separated configuration.

The self-locking feature of the ganged outlet unit 80 is illustrated in FIGS. 9 and 10. There is a cutout 70, or in some embodiments, a slot, recess, or depression formed in the side wall of the housing of the ganged outlet unit 80 corresponding to each locking outlet 20. The mating power cord 50 has a self-locking tab 60. A protrusion on the tab 60 engages the cutout, slot, recess, or depression 70 in the housing corresponding to an outlet 20 when the power cord 50 is plugged into the outlet 20. The engagement of the protrusion on the tab 60 with the cutout, slot, recess, or depression 70 locks the power cord 50 in place in the outlet 20. The self-locking tab 60 can be manually depressed to disengage the protrusion from the cutout, slot, recess, or depression 70 and allow the power cord 50 to be removed from the outlet 20, as illustrated in FIG. 10.

Figure 11:
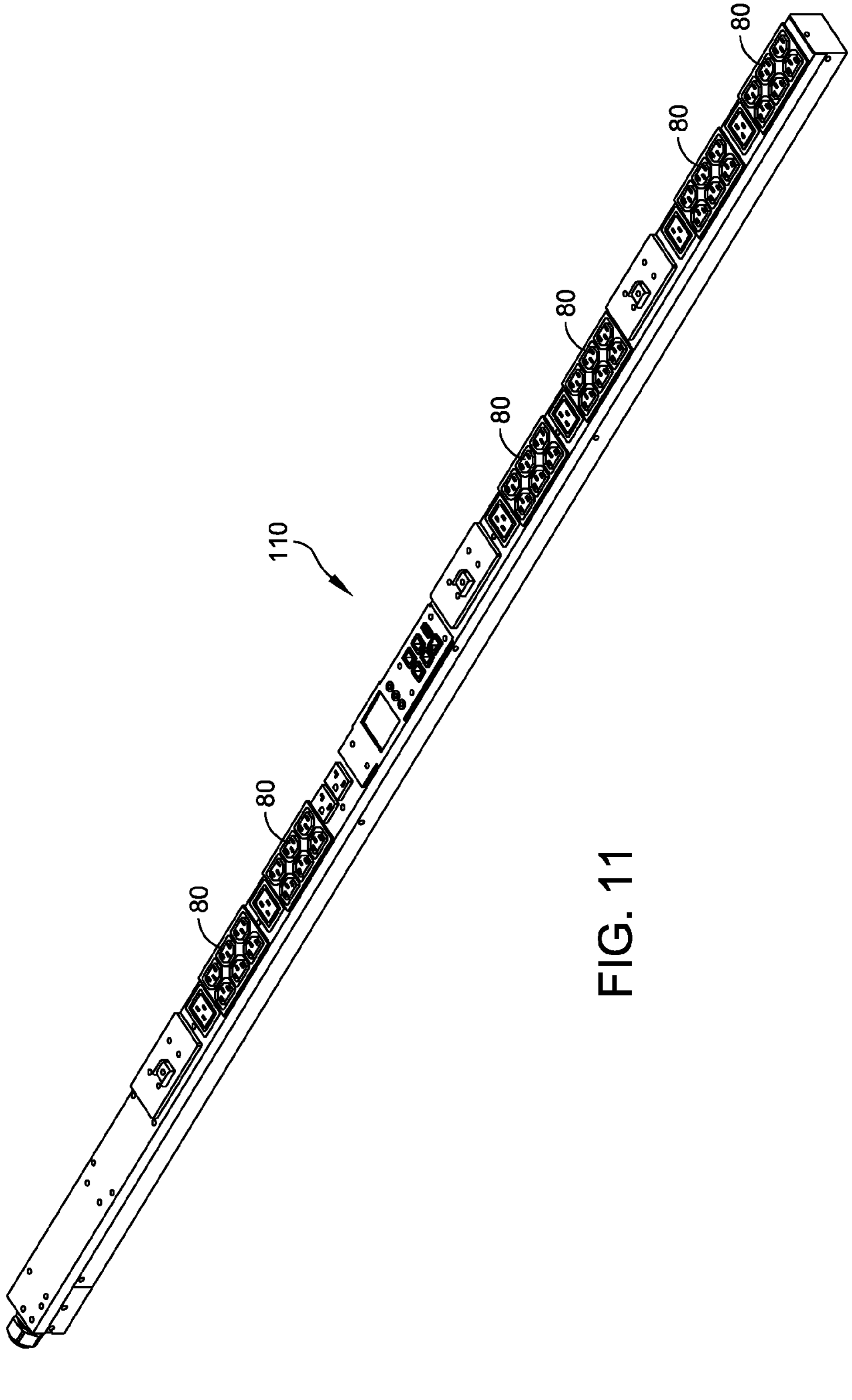
FIG. 11 is an isometric view of a power distribution unit including six ganged outlet units in accordance with an embodiment of the present invention.
Figure 12:
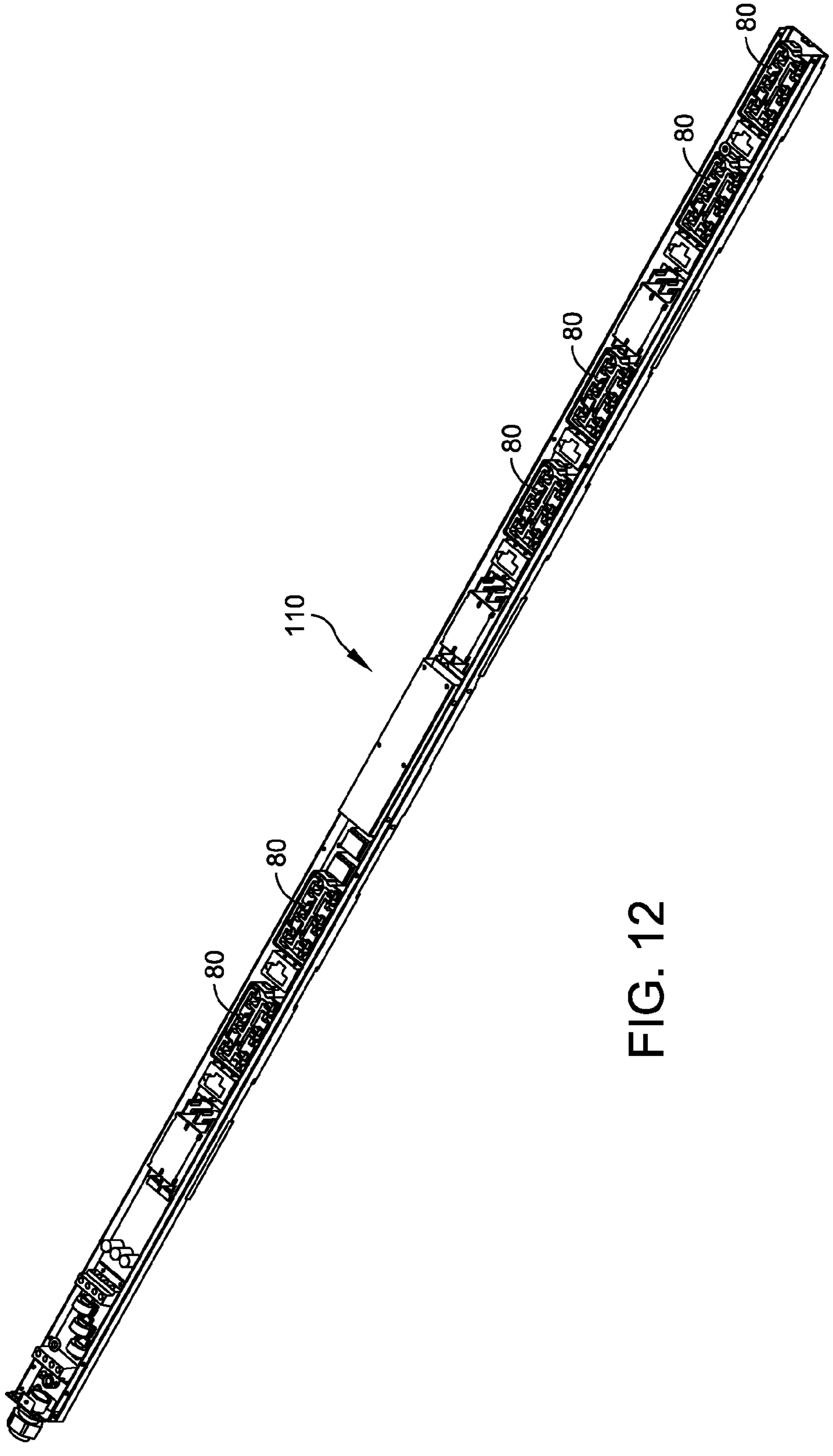
FIG. 12 is an isometric view of the power distribution unit of FIG. 11 from the rear side.

The ganged outlet unit 80 according to embodiments of the present disclosure may be used on a PDU 110 configured for mounting on an electronics equipment rack. One example of such a PDU 110 is illustrated in FIGS. 11 and 12. The PDU of FIGS. 11 and 12 includes six ganged outlet units 80 having six electrical outlets 20 each. In alternate embodiments, PDUs may include more or fewer ganged outlet units 80 and the ganged outlet units may include more or fewer than six electrical outlets 20 each. Not all ganged outlet units 80 mounted to a PDU 110 need be configured in the same manner or with the same number of electrical outlets 20. The PDU 110 of FIGS. 11 and 12 includes electrical bus lines (not shown) for delivering electrical power and providing ground to the electrical connections of the ganged outlet units 80 installed thereon. Ganged outlet units 80 according to embodiments of the present invention can also be used more broadly in other applications including UPS devices and other power distribution devices.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power distribution unit comprising:

a housing including:

a first outer edge;

a second outer edge; and a top surface contained between the first outer edge and the second outer edge and having a plurality of power outlets, disposed within a plurality of concave regions formed in the housing, each of the plurality of power outlets having three output terminals, including a ground terminal, a first terminal, and a second terminal;

at least one slot formed in the housing adjacent at least one of the plurality of power outlets, the at least one slot being configured to retain a locking tab of a locking power cord inserted into one of the plurality of power outlets;

wherein the plurality of power outlets are arranged in two adjacent columns, including a first column and a second column with at least two power outlets in each of the first column and the second column;

wherein the plurality of power outlets are arranged such that the first terminals and the second terminals of the power outlets in the first column are formed along a first line, the first terminals and the second terminals of the power outlets in the second column are formed along a second line, the ground terminals of the power outlets in the first column are formed along a third line, and the ground terminals of the power outlets of the second column are formed along a fourth line;

wherein the first line, the second line, the third line, and the fourth line are arranged in parallel;

wherein the plurality of power outlets are arranged in an arrangement in which the third and fourth lines are positioned between the first and second lines.

2. The power distribution unit of claim 1, wherein the input includes a power cord having a ground conductor coupled to the ground terminals of each of the plurality of power outlets, a first conductor coupled to each of the first terminals of the plurality of power outlets, and a second conductor coupled to each of the second terminals of the plurality of power outlets.

3. The power distribution unit of claim 1, further comprising a battery contained within the housing, and wherein the power distribution unit is configured as an uninterruptible power supply configured to provide power to the first terminals and the second terminals of the power outlets from the battery upon loss of power at the input.

4. The power distribution unit of claim 1, wherein the housing has a width and a length, with the length being greater than the width, and wherein the length of the housing extends in a direction parallel to the first line.

5. The power distribution unit of claim 4, wherein the plurality of power outlets consists of six power outlets contained in the housing, and wherein the housing has a length of about 10.1 cm and a width of about 5.5 cm.

6. The power distribution unit of claim 1, wherein each of the plurality of power outlets is electrically connected to a ground conductor, a first conductor and a second conductor and wherein at least one of the ground conductor, the first conductor and the second conductor of at least one of the plurality of power outlets is electrically isolated from each of the ground conductor, the first conductor, and the second conductor of all other of the plurality of power outlets in the power outlet unit.

7. The power distribution unit of claim 1, wherein the power outlets conform to the International Electrotechnical Commission IEC 60320 standard.

8. The power distribution unit of claim 1, wherein a spacing between adjacent power outlets is less than a spacing between the third and the fourth lines.

9. The power distribution unit of claim 1, further comprising a rear surface contained between the first outer edge and the second outer edge and having power input terminals asymmetrically arranged about a center axis of the power outlet unit disposed thereon.

10. The power distribution unit of claim 1, wherein the housing is asymmetrical.

11. The power distribution unit of claim 1, wherein adjacent outlets in adjacent columns are spaced apart by a distance of about 1.1 mm and adjacent outlets in a single column are spaced apart by a distance of about 2.2 mm.

12. A power outlet unit comprising:

a housing including a top surface and four outer walls arranged as a pair of side walls and a pair of end walls, wherein each of the side walls includes at least one of a slot or recess formed therein, and the top surface includes a plurality of openings formed thereon and exposing a plurality of concave regions; and a plurality of electrical outlets arranged in two adjacent columns and contained within the four outer walls, each electrical outlet of the plurality of electrical outlets including a socket having a plurality of terminals, each socket being contained within only one concave region of the plurality of concave regions;

wherein each slot or recess that is located in an outer wall of the housing is configured to retain a locking tab of a locking power cord inserted into one of the plurality of electrical outlets.

13. The power outlet unit of claim 12, wherein the plurality of electrical outlets includes at least one group of four electrical outlets arranged in a 2×2 grid arrangement.

14. The power outlet unit of claim 13, wherein the plurality of electrical outlets includes at least one group of six electrical outlets arranged in a 2×3 grid arrangement.

15. The power outlet unit of claim 14, wherein the at least one group of six electrical outlets are arranged within a surface having a surface area of less than 60 square centimeters.

16. A method of distributing power comprising:

mounting a power distribution unit in an electrical equipment rack containing electrical equipment, the power distribution unit including a plurality of power outlets each having an opening to receive a locking tab of a locking power cord;

providing a plurality of locking power cords each having a first end and a second end, the second end having a locking tab, and the second end having a first terminal, a second terminal and a ground terminal;

coupling the first end of a first locking power cord to a first electrical equipment unit mounted in the electrical equipment rack;

coupling the second end of the first locking power cord into a first one of the plurality of power outlets such that the locking tab of the first locking power cord mates with the opening of the first one of the plurality of power outlets, and such that the first terminal, the second terminal and the ground terminal of the first one of the plurality of power outlets are in a first rotational position;

coupling the first end of a second locking power cord of the plurality of locking power cords to a second electrical equipment unit mounted in the electrical equipment rack;

coupling the second end of the second locking power cord into a second one of the plurality of power outlets such that the locking tab of the second locking power cord mates with the opening of the second one of the plurality of power outlets, and such that the first terminal, the second terminal and the ground terminal of the second one of the plurality of power outlets are in a second rotational position offset from the first rotational position by 180 degrees.

17. The method of claim 16, wherein the plurality of power outlets includes at least one group of four power outlets arranged in a 2×2 grid arrangement.

18. The method of claim 16, further comprising coupling the second end of a third locking power cord into a third one of the plurality of power outlets such that the locking tab of the third locking power cord mates with the opening of the third one of the plurality of power outlets, and such that the first terminal, the second terminal and the ground terminal of the third one of the plurality of power outlets are in the first rotational position.

19. The method of claim 18, further comprising coupling the second end of a fourth locking power cord into a fourth one of the plurality of power outlets such that the locking tab of the fourth locking power cord mates with the opening of the fourth one of the plurality of power outlets, and such that the first terminal, the second terminal and the ground terminal of the fourth one of the plurality of power outlets are in the second rotational position.

20. The power distribution unit of claim 1, wherein each power outlet of the plurality of power outlets has a maximum length and a maximum width, with the maximum length of each power outlet defined along a dimension parallel to the first line being greater than the maximum width of the power outlet defined along a dimension perpendicular to the first line.

* * * * *